(12) United States Patent
Huras et al.

(10) Patent No.: US 7,203,802 B2
(45) Date of Patent: Apr. 10, 2007

(54) SYSTEM AND METHOD FOR USING A BUFFER TO FACILITATE LOG CATCHUP FOR ONLINE OPERATIONS

(75) Inventors: Matthew A. Huras, Ajax (CA); Quanhua Hong, Toronto (CA); Catherine S. McArthur, Uxbridge (CA); Lorysa M. Meadowcroft, Toronto (CA); Shaun K. Thornborough, Edmonton (CA); Michael J. Winer, Markham (CA); Roger L. Q. Zheng, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 10/425,163

(22) Filed: Apr. 29, 2003

(65) Prior Publication Data
US 2004/0221030 A1 Nov. 4, 2004

(51) Int. Cl.
*G06F 12/00* (2006.01)

(52) U.S. Cl. ............ 711/154; 711/156; 711/100; 711/102; 711/103; 711/104; 711/165; 709/224

(58) Field of Classification Search .......... 709/224; 711/156, 154, 100, 102, 103, 104
See application file for complete search history.

(56) References Cited

U.S. PATENT DOCUMENTS

| 5,697,641 | A | 12/1997 | McGee et al. ............ 280/743 |
| 5,721,915 | A | 2/1998 | Sockut et al. ............ 395/616 |
| 5,729,742 | A | 3/1998 | Harbinski et al. ......... 395/618 |
| 5,778,388 | A * | 7/1998 | Kawamura et al. ........ 707/203 |
| 5,787,409 | A | 7/1998 | Seiffert et al. ............ 706/45 |
| 6,026,412 | A | 2/2000 | Sockut et al. ............ 707/200 |
| 6,061,769 | A * | 5/2000 | Kapulka et al. ........... 711/162 |
| 6,564,215 | B1 * | 5/2003 | Hsiao et al. .............. 707/8 |
| 2002/0112087 | A1 * | 8/2002 | Berg ..................... 709/313 |
| 2002/0194338 | A1 * | 12/2002 | Elving ................... 709/226 |
| 2003/0009477 | A1 * | 1/2003 | Wilding et al. .......... 707/104.1 |

FOREIGN PATENT DOCUMENTS

JP 5002515 A 1/1993

OTHER PUBLICATIONS

Edward Omiecinski et al., "Concurrent File Reorganization for Record Clustering: A Performance Study," IEEE 1992.

(Continued)

*Primary Examiner*—Stephen C. Elmore
*Assistant Examiner*—Daniel Kim
(74) *Attorney, Agent, or Firm*—Samuel A. Kassatly

(57) ABSTRACT

A memory buffer facilitates log catchup for online operations. Certain designated areas of memory are allocated for one or more buffers for use during online operations (e.g., reorganization, create index, etc.). Concurrent update activities to the target object write informational records into the one or more buffers. If the buffers become full, the informational records may be written to logs for persistent storage. After online operations finish building all or a suitable portion of the shadow object, log catchup is performed by first applying activities in the informational records from the buffer and thereafter applying activities from logs, if necessary. The invention helps solve the drawbacks of log catchup since the buffer contains only the information related to the target shadow object. Also it does not involve physical I/Os, as these records are all in memory.

31 Claims, 5 Drawing Sheets

OTHER PUBLICATIONS

Kozuhiko Mogi et al., "Dynamic Parity Stripe Reorganizations for RAID5 Disk Arrays," IEEE 1994.

Edward Omiecinski et al., "Performance Analysis of a Concurrent File Reorganization Algorithm for Record Clustering," IEEE Transactions On Knowledge And Data Engineering, vol. 6, No. 2, Apr. 1994.

Olivier Devillers et al., "The Shuffling Buffer," International Journal of Computational Geometry & Applications, vol. 11, No. 5 (2001), pp. 555-572.

Chee Chye Lin et al., "Crystal: An Experimental Distributed System for Highly Available Databases," Proceedings of the 1991 Singapore International Conference on Networks, Sep. 5-6, 1991.

A.J. Heimsoth et al. ""On-Line" Error And Statistics Logging In Large Data Base Systems," IBM Technical Disclosure Bulletin, vol. 19, No. 8, Jan. 1977.

"Enhanced Buffer Deferred Write Algorithm For Certain Database Utilities," IBM Technical Disclosure Bulletin, vol. 32, No. 10B, Mar. 1990.

Mahesh Kallahalla et al., "Improving Parallel-Disk Buffer Management Using Randomized Writeback," Proceedings of ICPP, 1998.

* cited by examiner

SYSTEM AND METHOD FOR USING A BUFFER TO FACILITATE LOG CATCHUP FOR ONLINE OPERATIONS

FIELD OF THE INVENTION

The present invention relates in general to information retrieval systems, and more particularly to a technique for facilitating log catchup following certain online operations of information retrieval systems, such as online create and reorganization.

BACKGROUND OF THE INVENTION

One popular form of an information retrieval system for managing computerized records is a relational database management system such as DB2™, manufactured by International Business Machines Corporations. Between the actual database (i.e., the data as stored for use by a computer) and the users of the database is a software layer known as the relational database management system ("RDBMS" or "DBMS"). The DBMS is responsible for handling all requests for access to the database, shielding the users from the details of any specific hardware or software implementation. Using relational techniques, the DBMS stores, manipulates and retrieves data in the form of table-like relations typically defined by a set of columns or attributes of data types and a set of rows (i.e., records or tuples) of data. The columns may further comprise restrictions on their data content (i.e., valid domains) and may be designated as a primary key or unique identifier for the relation or a foreign key for one or more other relations.

Log catchup is a technique commonly used in the database industry during certain online operations whereby a database remains available to users online while undergoing operations such as: online create index (OLIC) or online reorganize index (OLIR), online reorganize table or tablespace. Typically, online operations employing the log catchup technique replicate the database target to be built or reorganized online, creating a separate shadow object. This shadow object is then processed in accordance with the build or reorganize operation while the original database target remains available for read/write access by concurrent readers/writers. One or more logs of operations by the concurrent reader/writers are maintained by the database system for subsequent application to catch up the shadow object to the currency of the original database target. Once caught up, the original database is locked for access briefly as the shadow object is made available for use.

There could potentially be considerable logs to be processed and significant amount of physical input/output operations (I/Os) involved, especially when the target to be built or reorganized is large and requires many hours to be (re)built. Furthermore, the log is frequently flushed to disk, and in fact, can be archived to longer term storage (e.g., tape). Thus log catchup is inherently limited by the speed of these storage devices. Also, the logs of operations normally contain log records for the whole database, and not just for the target object of interest. Log catchup requires reading through each log record accumulated during the period when an online operation is started until the shadow object becomes as current as the target.

Thus, using log catchup can potentially encounter a number of problems. For example, if there are too many update activities on the database, log catchup may never catch up. Objects that need to be built or rebuilt online are usually large size and thus make log catchup an inherently long process, and one that is computationally expensive due to all the physical I/Os involved. Log catchup can be a long and slow process even when there fewer update activities on the target object since logs are not just for the shadow object.

What is therefore needed is a system and associated method for improving the performance of the log catchup function with respect to speed and efficiency. The need for such a system and method has heretofore remained unsatisfied.

SUMMARY OF THE INVENTION

The present invention satisfies this need, and presents a system, a computer program product, and an associated method (collectively referred to herein as "the system" or "the present system") for using a memory buffer to facilitate log catchup for online operations. Some designated areas of memory are allocated for one or more buffers for use during online operations (e.g., reorganization, create index, etc.). Concurrent update activities to the target object write informational records into the one or more buffers. If the buffers become full, the informational records may be written to logs for persistent storage. After online operations finish building all or a suitable portion of the shadow object, log catchup is performed by first applying activities in the informational records from the buffer and thereafter applying activities from logs, if necessary.

The present system helps solve the drawbacks of log catchup since the buffer contains only the information related to the target shadow object. It does not involve physical I/Os, as these records are all in memory. The present system helps to drive a faster catch up.

Thus, in one aspect, for an information retrieval system providing online operations to replace a target object with a shadow object, the target object being available to one or more users for online activities during execution of the online operations, the present system provides a method for log catchup of the online activities to the shadow object. The method comprises logging to a buffer the online activities of the target object, the buffer stored in a memory of the information retrieval system and the memory having a faster response time relative to a persistent storage device; and applying the activities to the shadow object to catchup the shadow object to the target object.

In accordance with a feature of the present invention, the method comprises the step of logging to a log the online activities of the target object, the log for storage to a persistent storage device coupled to the information retrieval system. Logging to the buffer may comprise flagging a successful logging to the log so that the step of applying comprises applying the online activities from the buffer in response to the flagging.

Logging to a log may occur only when the buffer is full. The step of applying may comprise obtaining from the buffer the activities logged to the buffer and obtaining from the log the activities only logged to the log.

In accordance with a further feature, the method may comprise allocating the buffer dynamically in response to the online activities. Allocating may comprise allocating one or more buffers and logging to a buffer may comprise logging to the same one or more buffers. Further, allocating one or more buffers may comprise allocating one or more buffers one at a time in response to the online activities. In accordance with a further feature, the method may comprise reusing a used buffer from which online operations have been applied for logging and, optionally, the method may be adapted to reuse a used buffer when available before allocating a buffer.

In accordance with a further feature, when a plurality of writers perform the online activities, the method may comprise permitting temporary exclusive access to the writers to the buffer for logging.

The method may be adapted such that logging and applying are performed concurrently.

The method may comprise suspending the step of applying and resuming the step of applying to facilitate the online operations.

In accordance with a further feature, the method may comprise suspending the online activities to the target object to facilitate online operations. As such, the method may comprise monitoring the step of applying relative to the step of logging and performing the suspending online activities in response to the monitoring results.

In accordance with another aspect of the present invention, for an information retrieval system comprising an online operations provider to replace a target object with a shadow object, the target object being available to one or more users for online activities during execution of the online operations, there is provided a system for log catchup of the online activities to the shadow object. The system comprises a buffer logging mechanism for logging to a buffer the online activities of the target object where the buffer is stored in a memory of the information retrieval system and where the memory has a faster response time relative to a persistent storage device. The online operations provider is adapted for applying the activities to the shadow object to catchup the shadow object to the target object.

In accordance with a further broad aspect of the present invention, for an information retrieval system providing online operations to replace a target object with a shadow object, the target object being available to one or more users for online activities during execution of the online operations, there is provided a computer program product having a computer readable medium tangibly embodying computer executable code for directing the information retrieval system to perform a log catchup of the online activities to the shadow object. The computer program product comprises code for logging to a buffer the online activities of the target object where the buffer is stored in a memory of the information retrieval system and where the memory has a faster response time relative to a persistent storage device. The computer program product also comprises code for applying the activities to the shadow object to catchup the shadow object to the target object.

In accordance with a broad aspect of the present invention, there is provided a computer data signal embodied in a carrier wave and having means in the computer data signal for directing an information retrieval system to perform any one of the methods of the present system.

In accordance with another aspect of the present invention, there is provided, for an information retrieval system for managing a target object and a shadow object, the target object being available to user activities, the shadow object being unavailable to the user activities, the method comprising logging any user activities operating on the target object, applying the logged user activities to the shadow object thereby updating the shadow object, and replacing the target object with the shadow object.

In accordance with another aspect of the present invention there is provided an information retrieval system for managing a target object and a shadow object, the target object being available to user activities, the shadow object being unavailable to the user activities. The information retrieval system comprises means for logging any user activities operating on the target object, means for applying the logged user activities to the shadow object thereby updating the shadow object, and means for replacing the target object with the shadow object.

In accordance with another aspect of the present invention a computer program product having a computer readable medium tangibly embodying computer executable code for directing an information retrieval system to managing a target object and a shadow object, the target object being available to user activities, the shadow object being unavailable to the user activities, the computer program product comprising code for logging any user activities operating on the target object, code for applying the logged user activities to the shadow object thereby updating the shadow object, and code for replacing the target object with the shadow object.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system or computer programming language and would not be a limitation of the present invention. The present system includes a software programming code or computer program product that is typically embedded within, or installed on a computer. Alternatively, the present system can be saved on a suitable storage medium such as a diskette, a CD, a hard drive, or like devices.

Figure 1:
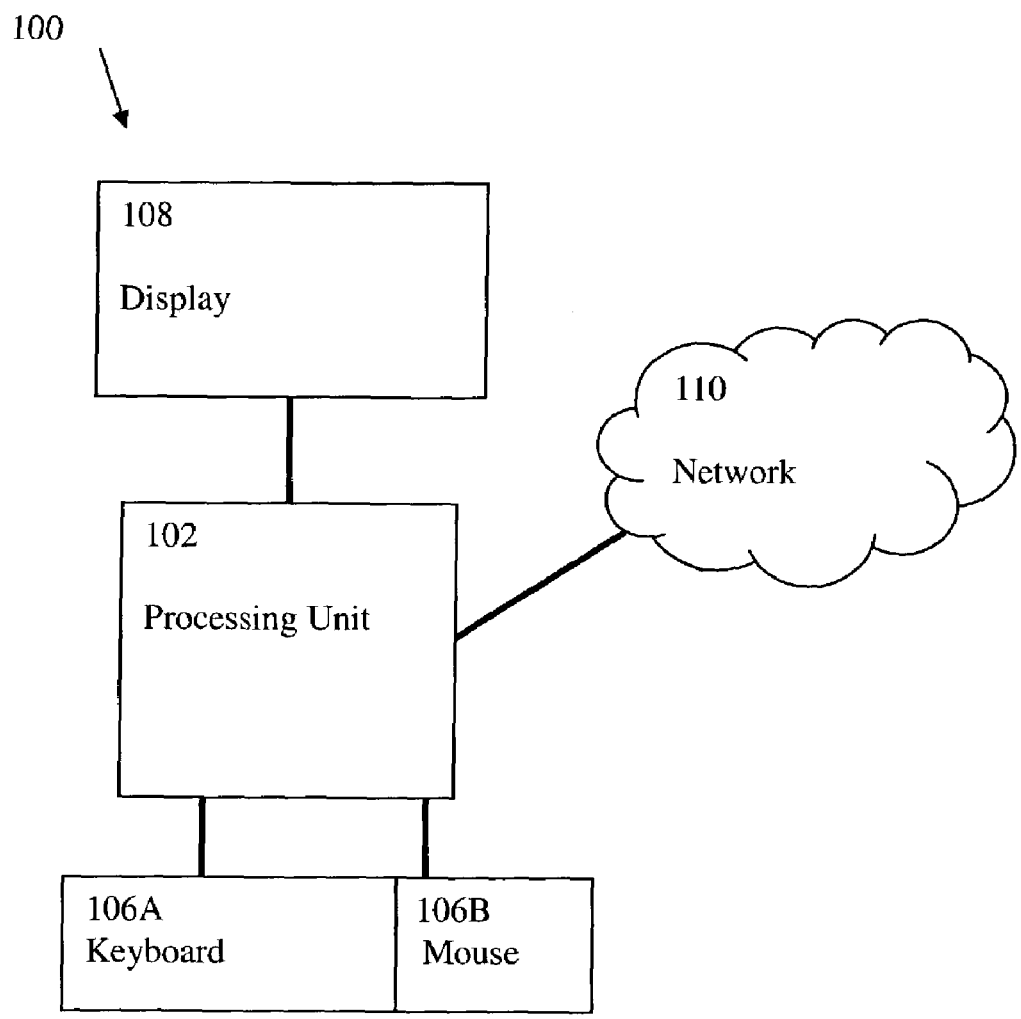
FIG. 1 is a schematic illustration of an exemplary operating environment in which a method for using a buffer to facilitate log catchup for online operations system of the present invention can be used.

An embodiment of the invention, computer system 100, is illustrated in FIG. 1. Computer system 100, which is illustrated for exemplary purposes as a single computing device, is adapted to communicate with other computing devices (not shown) using network 110. As may be appreciated by those of ordinary skill in the art, network 110 may be embodied using conventional networking technologies and may comprise one or more of the following: local networks, wide area networks, intranets, the Internet, and the like.

Through the description herein, an embodiment of the invention is illustrated with aspects of the invention embodied solely on computer system 100. As may be appreciated by those of ordinary skill in the art, aspects of the invention may be distributed among one or more networked computing devices that interact with computer system 100, using one or more networks such as, for example network 110. However, for ease of understanding, aspects of the invention have been embodied in a single computing device, computer system 100.

Computer system 100 typically comprises a processing unit 102 (alternately referenced as processing system 102) that is enabled to communicate with the network 110, various input devices and output devices. As shown in FIG. 1 for exemplary purposes, the input devices comprise a keyboard 106A and mouse 106B, and output devices comprise display 108 (alternately referenced as input devices 106, output devices 108, or I/O devices 106, 108). Input devices 106 may also comprise a scanner, an imaging system (e.g., a camera, etc.), or the like. Similarly, output devices 108 may also comprise printers and the like. Additionally, combination input/output (I/O) devices 106, 108 may also be in communication with processing system 102. Examples of conventional I/O devices (not shown in FIG. 1) comprise removable recordable media (e.g., floppy disk drives, tape drives, CD-ROM drives, DVD-RW drives, etc.), touch screen displays, and the like.

Figure 2:
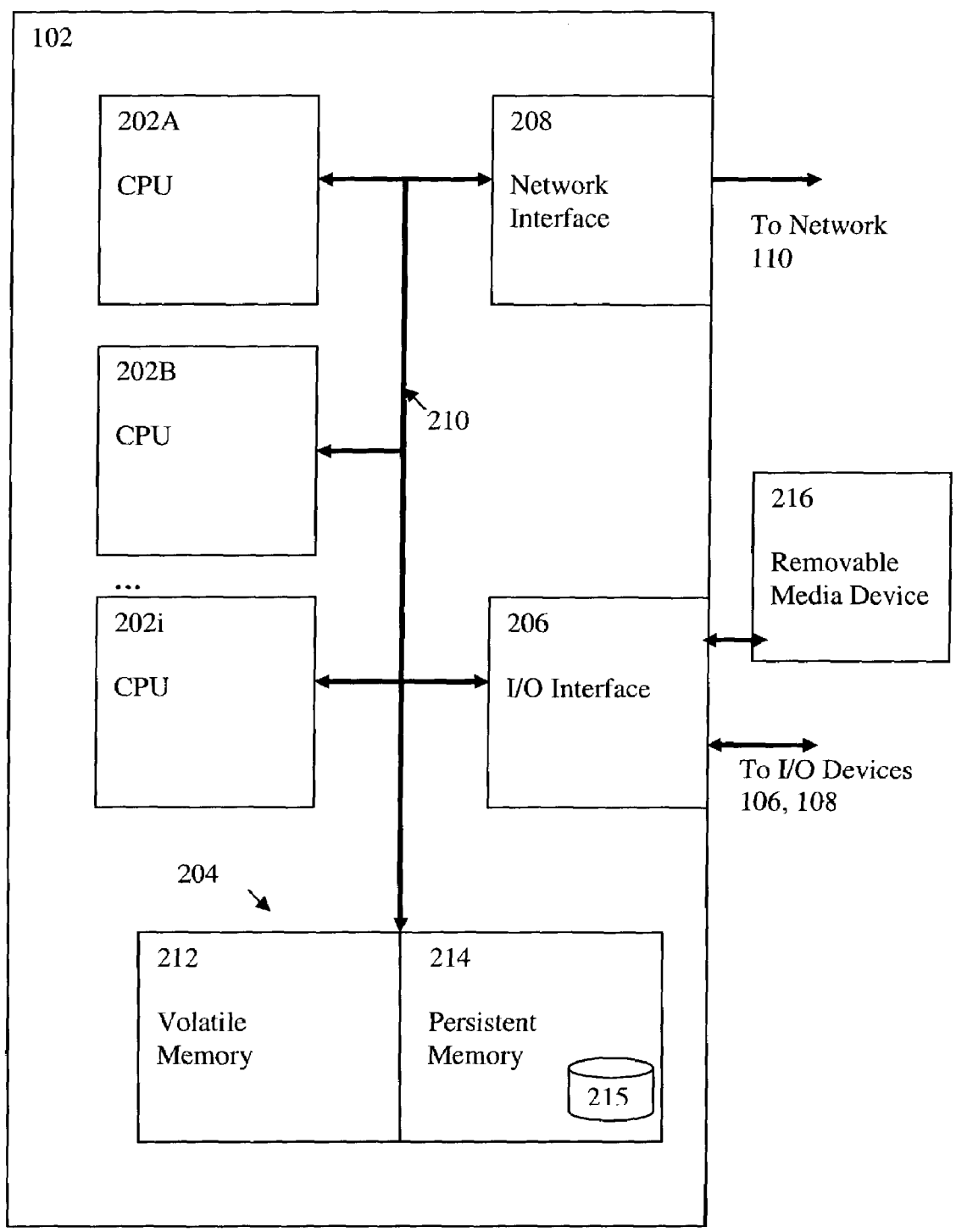
FIG. 2 is a block diagram schematically illustrating in greater detail a portion of the computer of FIG. 1.

Exemplary processing system 102 is illustrated in greater detail in FIG. 2. As illustrated, processing system 102 comprises a number of components: a plurality of central processing units (CPUs) 202A, 202B, . . . 202$i$, collectively 202; memory 204; network interface (I/F) 208; and input-output (I/O) interface 206. Communication between various components of the processing system 102 may be facilitated via a suitable communications bus 210 as required.

Each CPU 202 is a processing unit, such as an Intel Pentium™, IBM PowerPC™, Sun Microsystems UltraSparc™ processor, or the like, suitable for the operations described herein. As may be appreciated by those of ordinary skill in the art, other embodiments of processing system 102 could use alternative CPUs and may comprise embodiments in which one CPU is employed (not shown). CPUs 202 may comprise various support circuits to enable communication between CPUs 202 and the other components of processing system 102.

Memory 204 comprises both volatile memory 212 and persistent memory 214 for the storage of the following: operational instructions for execution by CPUs 202; data registers; application and thread storage; and the like. Memory 204 preferably comprises a combination of random access memory (RAM), read only memory (ROM), and persistent memory such as that provided by a hard disk drive. Persistent memory 214 comprises an exemplary database 215 as described further below.

CPU 202 is typically coupled (to I/O devices 106, 108 or network 110) for receiving user queries and for returning the results of the queries. User queries typically comprise a combination of SQL commands for producing one or more tables of output data. CPU 202 is coupled to memory 204 as described further with respect to FIG. 3 for containing programs and data such as base tables or virtual tables such as views or derived tables (i.e., tables determined from one or more base tables according to CREATE VIEW or other statements) in database 215.

Network I/F 208 enables communication between other computing devices (not shown) and other network computing devices via network 110. Network I/F 208 may be embodied in one or more conventional communication devices. Examples of a conventional communication device comprise the following: an Ethernet card; a token ring card; a modem, or the like. Network I/F 208 may also enable the retrieval or transmission of instructions for execution by CPUs 202, from or to a remote storage media or device via network 110.

I/O interface 206 enables communication between processing system 102 and the various I/O devices 106 and 108. I/O interface 206 may comprise, for example, a video card for interfacing with an external display such as output device 108. Additionally, I/O interface 206 may enable communication between processing system 102 and a removable media device 216. Removable media device 216 may comprise a conventional diskette or other removable memory devices such as Zip™ drives, flash cards, CD-ROMs, static memory devices, and the like. Removable media device 216 may be used to provide instructions for execution by CPUs 202 or as a removable data storage device.

Figure 3:
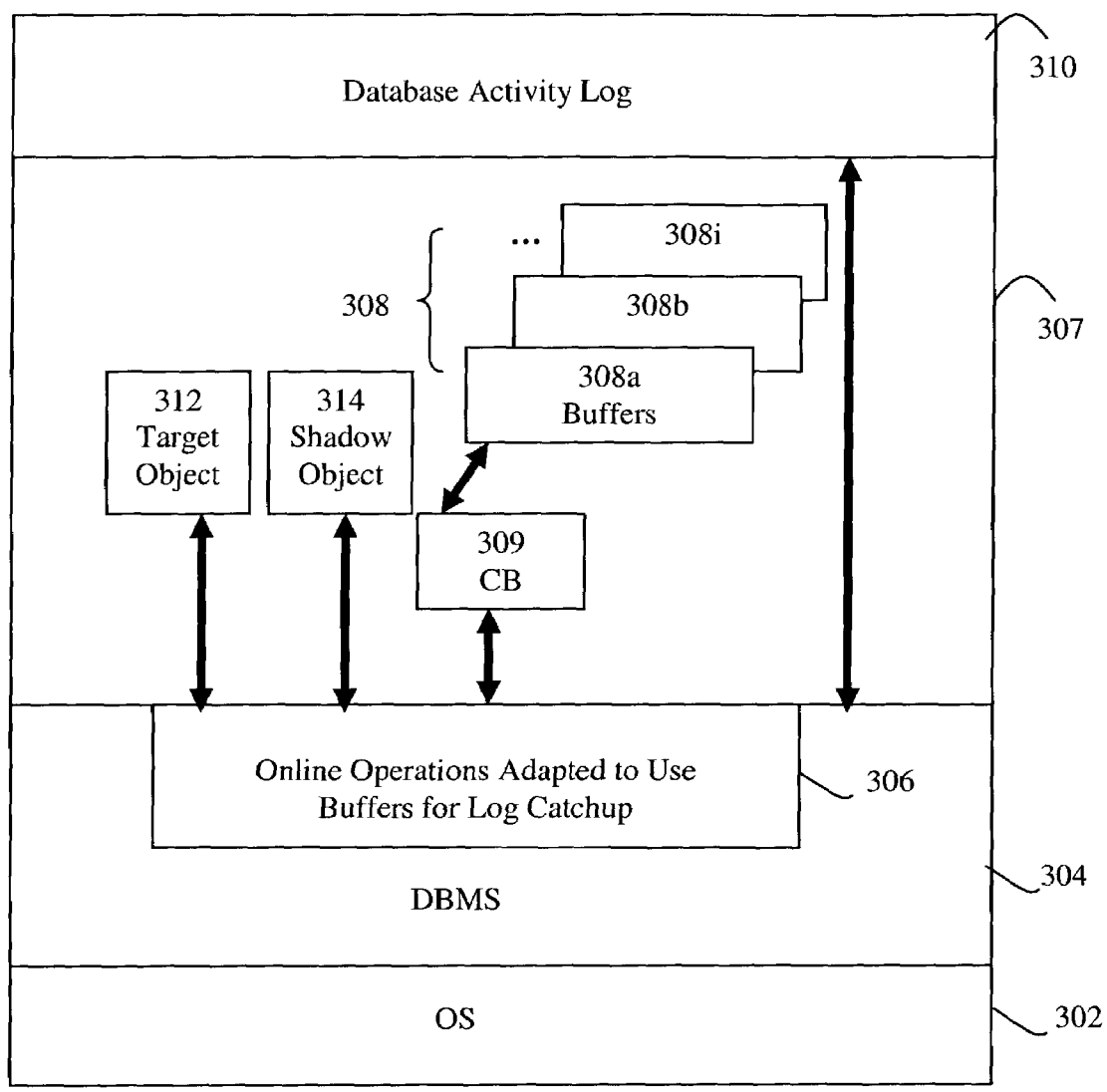
FIG. 3 is a block diagram illustrating a portion of the memory illustrated in FIG. 2.

The computer instructions/applications stored in memory 204 and executed by CPUs 202 (thus adapting the operation of computer system 100 as described herein) as a database system are illustrated in functional block form in FIG. 3. As may be appreciated by those of ordinary skill in the art, the discrimination between aspects of the applications illustrated as functional blocks in FIG. 3 is somewhat arbitrary in that the various operations attributed to a particular application as described herein may, in an alternative embodiment, be subsumed by another application. It may be appreciated that the computer system 100 may be shipped or installed without the database 215 to or by end users.

The programmed instructions may be embodied on a computer readable medium (such as a CD disk or floppy disk) that may be used for transporting the programmed instructions to the memory 204 of the computer system 100. Alternatively, the programmed instructions may be embedded in a computer-readable, signal-bearing medium that is uploaded to a network by a vendor or supplier of the programmed instructions and this signal-bearing medium may be downloaded to the computer system 100 from the network 110 by end users or potential buyers.

FIG. 3 illustrates volatile memory 212 of memory 204 of FIG. 2 comprising an operating system (OS) 302 and a database management system (DBMS) 304 providing online operations 306 employing log catchup adapted in accordance with the invention. Volatile memory 212 further comprises a database portion 307 comprising portions of database 215, such as a target database object, target object 312 for which the online operations 306 are intended and a resulting shadow object 314 built by the online operations. Database portion 307 further comprises an area of reserved memory 204 for use by DBMS 304 such as a heap for allocating one or more buffers (308$a$, 308$b$, . . . 308$i$, collectively 308) and CB 309 for log catchup and, if necessary, database activity log 310 (alternately referenced as log 310).

It is understood that volatile memory 212 may only be sufficient to contain a portion (e.g., selected active or recently active pages) of the programs (e.g., OS 302, DBMS 304 with online operations 306), data for database 215 (i.e., target database object 312 and shadow object 314) and database activity log 310 at any one instance. Respective remaining portions thereof are stored to persistent memory 214 that may comprise one or more storage devices (not shown). Such volatile memory 212 and persistent memory 214 may be configured in a hierarchy of storage options, depending on physical I/O characteristics.

In accordance with a feature of the present invention, buffers 308 and CB 309 are allocated from volatile memory 212 as described further herein below as such volatile memory 212 has a faster response time relative to persistent memory 214 and can thus provide advantageous log catchup processing characteristics.

OS 302 stored by volatile memory 212 is an operating system suitable for operation with selected CPUs 202 and the operations described herein. Multi-tasking, multi-threaded OSes such as, for example IBM AIX™, Microsoft Windows, Linux, or the like, are expected to be preferred in many embodiments. DBMS 304 provides a control program for managing the components of the database 215. The components comprise a component for receiving a query from a user and a component for processing the query typically in accordance with a query optimization process As may be apparent to those skilled in the art, only those activities by concurrent writers related to target database object 312 affecting the contents of the target database object 312 need be recorded to buffers 308 for subsequent application to shadow object 314. Activities written to log 310 are defined in accordance with the operations of a logging service (not shown) of DBMS 304 maintaining such logs 310 and may comprise all activities related to the database object. It is further understood that activities recorded to the buffer 308 may be redundantly recorded to the log 310 for recovery or other purposes.

In accordance with the present embodiment, buffers 308 and CB 309 are managed as a linked list or buffer chain and used via a suitable mechanism such as an application programming interface (API). A buffer chain structure CB 309 may be dynamically allocated, for example, at the start of an online operation 306. CB 309 contains all related information about using the buffers 308, and the memory may be allotted from persistent memory 214 from a suitable memory heap (not shown) maintained by DMBS 304 or OS 302 for example. CB 309 may be defined in accordance with the following exemplary tabular memory structure:

```
struct SQLI_OLIC_BUF_CB
{
    SQLI_OLIC_BUFFER *olicBuffers;        /* used buffer chain */
    SQLI_OLIC_BUFFER *lastOlicBuffer;     /* ptr to the last buffer in the chain */
    SQLI_OLIC_BUFFER *emptyOlicBuffers;   /* empty buffer chain */
    Uint32 numBytesProcessed;             /* no of bytes that have been processed in first buffer */
    Uint32 bufferFull;                    /* TRUE/FALSE flag */
    SQLP_LSN logStartLsn;                 /* lsn to read logs (used when buffer is full and */
                                          /* no more buffer available) */
    struct sqlo_xlatch olicBufLatch;      /* Fast exclusive latch for access to buffers */
}
``` that may comprise a query model (e.g., QGM). Additional components perform query plan determination comprising generating, costing and selecting a plan as well as eventual plan execution. Execution is performed by one or more concurrent readers and writers who access the database 215.

Further, DBMS 304 provides online operations 306 (such as online create or reorganize indexes, online reorganize table or table space). These operations may be initiated by an administrator, for example, or automatically if DMBS 305 is so adapted. These online operations 306 employ a log catchup technique, adapted in accordance with the present invention, to make current a shadow object 314 built or otherwise processed in accordance with the online operations 306. As the shadow object 314 is built and caught up, activities in relation to target database object 312 that the shadow object 314 is intended to replace are recorded to the log catchup buffers 308, and, if all buffers 308 are full, to log 310. In an embodiment of the invention, the informational records written to a buffer 308 comprise a two byte total-Length of record and the log record itself detailing the operation. A totalLength of zero (0) bytes may be used to indicate a most current log record that is not ready to be read to trigger the end of catchup.

Log 310 typically comprises activity information for other database objects (not shown) as well as the target database object 312. Log 310 is frequently flushed to persistent memory 214 (e.g., a hard disk).

In accordance with the present embodiment of CB 309, all buffers 308 that haven't been processed by the log catchup operations may be chained in an olicBuffers chain. All the buffers 308 that have been processed by catchup operations and can be reused are chained together in emptyOlicBuffers chain. The pointer lastOlicBuffer points to the last buffer 308 in the chain, and it can facilitate a concurrent writer to quickly locate the current buffer 308 (e.g., 308i) to which it may write without having to traverse the buffer chain. For olicBuffers chain, buffers 308 may be appended at the end by concurrent writers and catchup reads from the beginning of the chain. For emptyOlicBuffers, newly free buffer 308 may be placed at or reused from the beginning of the chain by catchup operations and concurrent writers.

As may be apparent to those skilled in the art, once online operations 306 have finished building the shadow object 314 and making it current, a point at which the switch occurs between original target object 312 and shadow object 314 should be determined. Such a sync point is typically determined by DMBS 304 and involves a lock out period to quiesce (i.e., render inactive, unavailable to users) the table containing the target object 312 so that there are no concurrent readers and writers accessing the target object 312.

Log catchup operations are usually performed following a shadow object build; however, building and log catchup operations may be alternately cycled. For example, a target table may have multiple target objects 312 within that table that need to be rebuilt (e.g., multiple indices). The DBMS 304 may choose to build one target object 312, perform log catchup, build another target object 312, perform log catchup, etc. until the final target for shadow object 314 is built and caught up. At the last iteration or phase, quiescing of the database target table is required to switch the entire object. This phase is referenced as a quiescing catchup. Earlier phases are non-quiescing. As such, numBytesProcessed is used for non-quiescing log catchup. If log catchup operations read a zero length record in non-quiescing mode log catchup, the current round of log catchup is suspended and log catchup is resumed after building the next index. Consequently, log catchup operations need to remember how many bytes have been processed in the current buffer 308 (e.g., 308A) that is also the first buffer 308 in olicBuffers chain.

The bufferFull flag is set by the concurrent writer when there is no empty buffer 308 to be reused and no space to be allocated from the heap. The concurrent writer may also get the tail LSN of the logs 310 and then update the logStartLsn. Once bufferFull is set, subsequent writers may simply check this flag to determine whether they need to write to buffers 308 and/or the log 310.

OlicBufLatch is used to control access to any of the fields in the buffer CB 309, which comprises all the updates to CB 309, such as: append a new buffer 308, reuse old buffer 308, write into buffer 308, set bufferFull, update logStartLsn, and most of the reads in buffer CB 309, such as, read informational records from buffer 308, get to the most current buffer 308, etc.

The following pseudo code provides an exemplary definition of a buffer 308, namely SQLI_OLIC_BUFFER:

```
struct SQLI_OLIC_BUFFER
{
SQLI_OLIC_BUFFER *next;   /* ptr to next olic buffer */
char         *buffer;     /* current buffer */
Uint32       bufSize;
Uint32       bufFreeSpace;     /* Free space in buffer */
};
```

The amount of free space left in a particular buffer 308 (e.g., 308i) to be written is bufFreeSpace. The concurrent writer also uses bufFreeSpace to calculate where to write in the particular buffer 308i (buffer+bufSize–bufFreeSpace). It's initialized as bufSize when the buffer 308i is first allocated, and decreased as concurrent writers write records into the buffer 308i. The above structure along with memory for a buffer 308i may be allocated by concurrent writers from the memory heap when necessary (i.e., dynamically as needed). Once allocated, a buffer 308i may be chained in olicBuffers chain in the buffer 308.

At the end of an online operation 306 (e.g., index create) or in an error exit path, a buffer de-allocation function (not shown) to traverse each buffer chain to de-allocate memory 204 for buffers 308 and buffer CB 309.

During online create (OLIC) and online reorganization (OLIR) log catchup operations, if olicBuffers is still NULL and bufferFull is set (i.e., there are no logs 310 to catch up yet) log catchup operations may either quiesce the table related to the target object 312 being (re)built or exit. Otherwise, log catchup operations may process buffers 308 to catch up. Once log catchup operations finish reading buffers 308, if there are no logs 310 to be caught up, table can be quiesced at this point. If there are logs 310 to be read, log catchup operations may perform log catchup from such logs 310 in a similar manner as is typically performed, except log catchup operations may have quiesced the table before it starts log catchup. That could be possible if at the end of buffer catchup, bufferFull flag is still 0, so catchup quiesces the table. However, some concurrent writer may obtain access to the table before log catchup operations request a table lock. In such as case, the writer may determine that the buffer 308 is full. The writer may update bufferFull and logStartLsn. After log catchup gets the table quiesced, it may need to read from logs 310 to catch up the last bit of any updates made by concurrent writers while it waits for the table lock.

For OLIR, log catchup operations may be done at the end of building each index. After the first index is reorganized, catchup may be performed for the first index; after the second index is reorganized, log catchup may be performed for both the first and the second index, and so on, until a final log catchup is done. However, prior to the final log catchup, the other rounds of log catchup for OLIR are all non-quiescing log catchup. That is, log catchup is performed as much as possible without table quiescing at the end of a round of log catchup. With non-quiescing log catchup, if catchup of the buffers 308 is complete and there are no logs 310 to catchup, log catchup operations may exit for online operations 306 to build the next index. If there are logs 310 to be caught up, then log catchup is performed for the logs 310. At the end of log catchup, the log LSN may be advanced at the end of each non-quiescing log catchup. Such log LSN is remembered in the logStartLsn in buffer CB 309.

Figure 4:
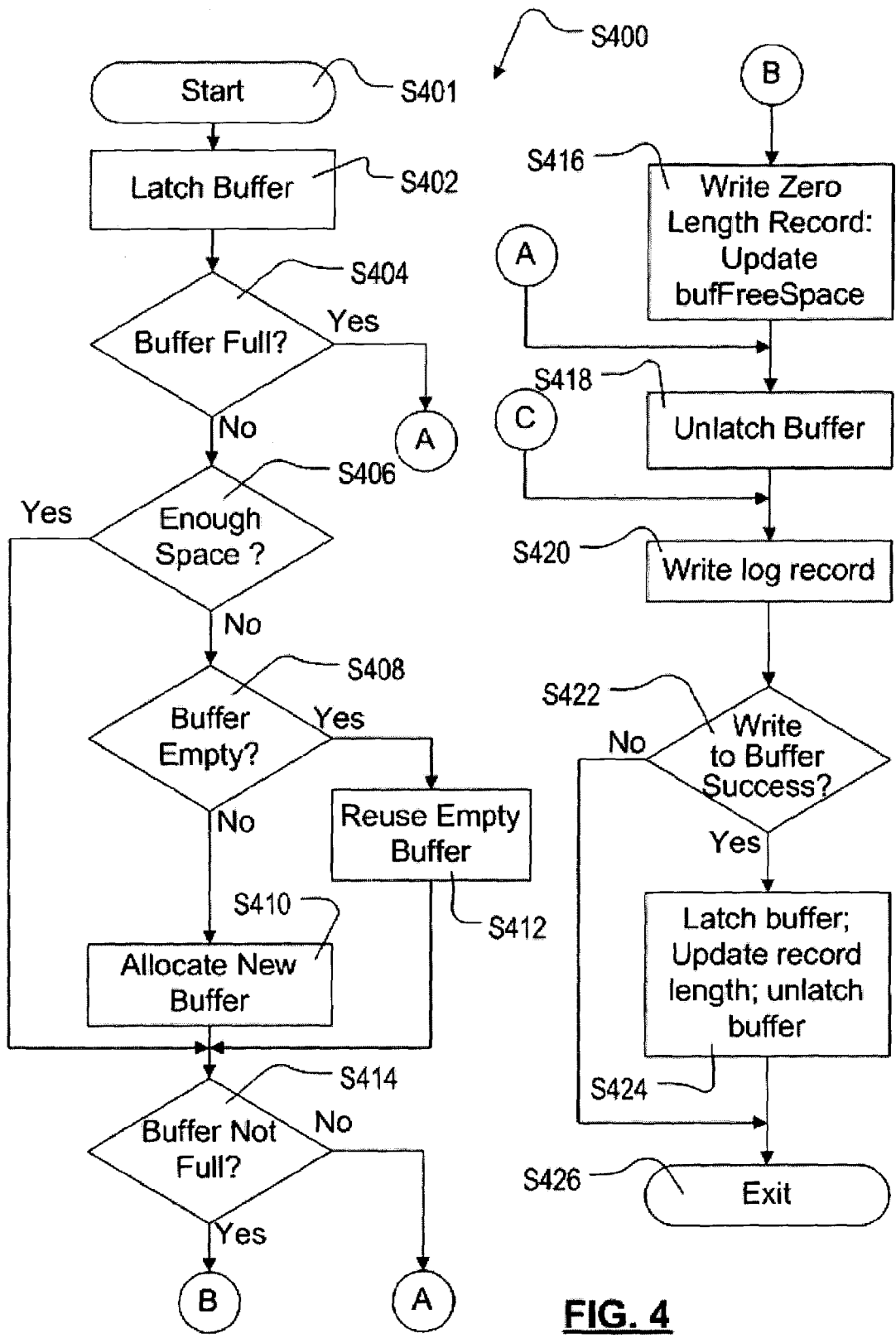
FIG. 4 is a process flow chart illustrating exemplary operations that use buffers for log catchup in accordance with the invention.
Figure 5:
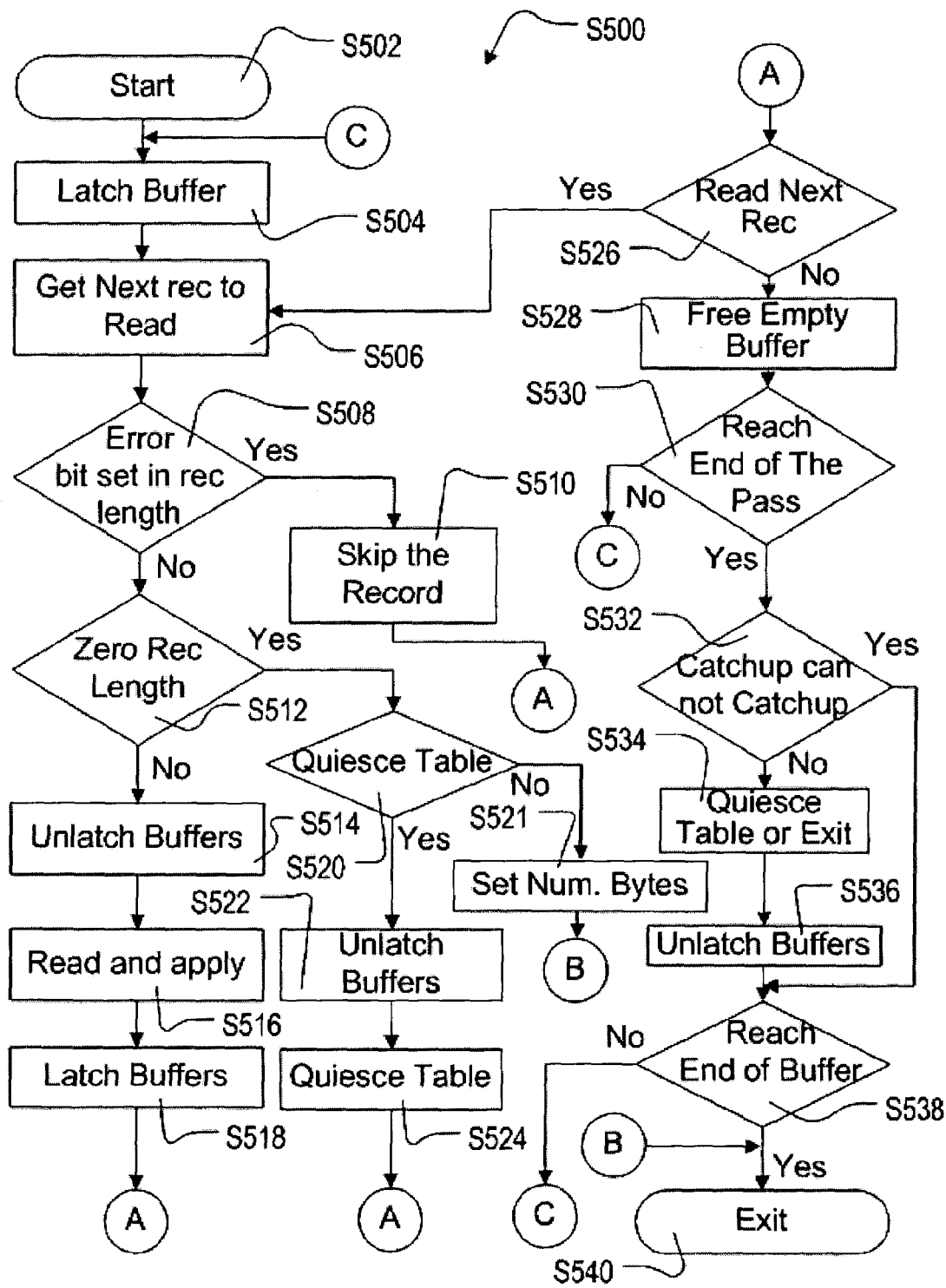
FIG. 5 is a process flow chart illustrating additional exemplary operations that use buffers for log catchup in accordance with the invention.

FIGS. 4 and 5 illustrate steps of operations to use buffers 308 during online operations 306 in accordance with an aspect of the invention. FIG. 4 illustrates operations S400 to use the buffers 308 to store activities of the database 215 with respect to the target object 312 by concurrent writers while FIG. 5 illustrates operations S500 to apply such stored activities to the shadow object 314 by online operations 306 for log catchup.

The first buffer 308A may be allocated by the first writer updating the target object 312 upon a first start S401 of operations S400. If there is no update activity on the table while the shadow object 314 is being online created/reorganized, then no buffer 308 need be allocated.

If a concurrent writer operates to update the target object 312, the writer may initiate log operations S400 at S401 such as through an application program interface (API). Buffer CB 309 is latched for reading at S402. A mechanism such as a fast exclusive latch may be used to control concurrent access to the buffers 308 by concurrent writers and log catchup operations. A check is made to determine if the buffer 308 is latched and the buffer 308 is latched if the check determines it is not already latched. Similarly, prior to unlatching a buffer 308, a check is made to determine that the buffer 308 is not already unlatched.

The bufferFull flag is evaluated by the concurrent writer to determine whether there are any buffers 308 into which a concurrent writer can write or if only logs 310 may be written (i.e., when there is no empty buffer 308 to be reused and no space to be allocated from the heap) (S404). If bufferFull is set, operations continue at S418 described below. If bufferFull is not set, a check is made to see if there is a usable buffer 308 into which a concurrent writer can write and if there is sufficient space in this buffer 308 for a desired information record (S406). If there is not sufficient space, either an empty (i.e., previously used and processed buffer 308) is selected for re-use (S408, S412) or a new buffer 308 may be allocated (S408, S410). Continuing from S410, S412 or S406, at S414, if the buffer 308 is full, operations continue at S418 as described below.

Otherwise, at S416, an information record is written to the buffer 308 with a zero length indicator to signal to log catchup operations that writing of the particular record is not complete, pending redundant writing to the logs 310.

At S418, buffer CB 309 is unlatched, freeing it for use by other concurrent writers. At S420, the concurrent writer writes a log of its activity to common log 316. This facilitates recovery from a persistent log should buffer catchup be aborted, for example. If the log write is a success, S422, the information record written to the buffer 308 is updated with the appropriate length applying the proper latch and unlatch to CB 309 (S424). Operations thereafter end or otherwise end, for example, if a log could not be made (S426).

In the present embodiment, a concurrent writer writes to a buffer 308 first and then writes a log to disk (i.e., to log 310 that is flushed to disk). If a concurrent writer has written into a buffer 308 successfully but failed to write to disk due to a non-severe error (for instance, log disk space full), it may need to update the buffer 308 to so indicate. One solution is as follows: when a concurrent writer first writes the informational record into the buffer 308, it writes a record length as 0 (S416). When writer finishes logging (S422), it returns to update the record length. If logging is successful, then it updates the record length as the actual record length (S424). Otherwise, it may update record length with a negative value of the actual record length (not shown). When log catchup operations read a positive record length, the record may be processed against the shadow object 314; if a negative record length is read, the record may be skipped; if a record length of 0 is read, then it means catchup has caught up with concurrent writers. Log catchup may either quiesce the table or exit.

In accordance with an embodiment of the invention, the size of buffer 308 may be fixed or variable depending on the memory 204 available. If a buffer 308 can't be granted, then concurrent writer may set the bufferFull flag to indicate the buffer 308 is full, so that all concurrent writers may only write to logs 310.

With reference to FIG. 5, log catchup operations S500 are illustrated for online operations 306. Operations S500 start and buffer CB 309 is latched (S502, S504). A next information record is read from the current buffer 308 to be processed for catchup (S506). If the record length is negative (i.e., error bit set) (S508), the record is ignored (S510) and processing continues at S526 described below.

If the record length is zero, the table may be quiesced in accordance with the mode of log catchup following a buffer unlatch (S512, S520, S522, and S524) and operations continued at S526 as discussed. Otherwise, for non-quiescing mode, the number of bytes processed is set (S521) and operations exit (S540).

If the record length is non-zero (S512), buffer 308 may be unlatched and the activity represented in the information record applied to the shadow object 314 (S514, S516). At S518, the buffer 308 is re-latched.

At S526, a determination made if there is another record for processing. If so, operations continue at S506. If not, the now empty buffer 308 is moved to the empty chain at S528. One log catchup pass is considered to be complete when the end point in the buffer chain is reached (S530), and an evaluation is made as to whether log catchup operations can in fact catch up (S532). During catchup, buffers 308 can be reused by concurrent updaters. Buffer catchup may comprise many passes, since the concurrent updaters can write into a buffer 308 during the process of buffer catchup. If catchup reads the buffers 308 at the same speed concurrent writers reuse buffers 308, buffer catchup can not catch up. To prevent this scenario, the starting point and the end point of the buffer 308 is remembered at the beginning of each pass by getting the address to the buffer 308. When buffer catchup finishes reading the end buffer 308 in the current pass, it may compare the amount of informational records that have been processed with the amount in the previous pass (S532). If the amount of current pass is below the threshold of previous pass, which means that the catch up is making positive progress, then buffer catchup may continue to step S538. If the amount is more than the threshold of previous pass, which means buffer catchup is not catching up fast enough, it may quiesce table for quiescing mode of catchup, or it may suspend current buffer catchup for non-quiescing mode catchup (S534). Then operations continue at S536 where the buffers 308 are unlatched.

At S538, a determination is made whether there are any unprocessed buffers 308. If there are no buffers 308, operations exit (S540) or otherwise return to S504. At S534, if the table is quiesced, online operations 306 may attempt to perform one final round of catchup if there are more log activities on the target object 312, which may be checked at S538. In addition, if at S534 online operations 306 is to exit catchup, then the later check at S538 should be NO.

In this embodiment of the invention, emptied buffers 308 are not de-allocated from the memory heap until the end of an online operation 306 such as index creation.

For OLIR, at the end of building each index, catchup may be performed; however the target table may not be quiesced at the end (i.e., non-quiescing mode catchup), unless catchup is operating for the last index (i.e., quiescing mode catchup).

Advantageously, log catchup in accordance with the invention supports allocation of buffer 308 dynamically and on demand. The first concurrent update activities on the target object 312 being shadow created or rebuilt may allocate the first buffer 308. Subsequent updates may keep writing to the buffer 308 until the buffer 308 is full and a second buffer 308 is allocated. Additional buffers 308 may be created, as limited by the available heap or other portion of volatile memory 212.

Log catchup supports maximum concurrency via latched access to buffers 308. Concurrent activities are allowed to update the shadow object 314 while online operations 306 read from buffers 308. A buffer 308 that has been processed by log catchup operations can be reused. Additionally, log catchup supports multiple rounds of catchup. Log catchup operations can be suspended, so that online operations 306 can come out of buffer catchup and revisit it at a later time. This feature is useful when there are multiple targets to be (re)built in the same object, and the same buffers 308 are to be used.

Writing to the buffer 308 by concurrent writers comprise the following phases: an informational record is written into the buffer 308 first, but the length field of the record is set as zero; concurrent writers then write log record into logs 310, and then update the record length field depending on whether log writing is successful. A negative value or other flag value may be set if writing of logs 310 fails.

When log catchup sees a zero length record, it means buffer catchup is likely nearly caught up to the end of the buffer 308. Depending on the mode of catchup (quiescing table mode or non-quiescing table mode), log catchup may either exit or quiesce the table which may wait on all the concurrent writers to commit/rollback.

Log catchup can dynamically determine whether to quiesce a target table to ensure catchup operations can in fact catch up to the activities recorded in the buffers 308. Log catchup can store the size of an informational record that was read in a pass and compare the size with the size for a previous pass. If catchup operations determine that the activities can not be caught up, the target table may be quiesced, preventing additional update activities until catchup.

It is to be understood that the specific embodiments of the invention that have been described are merely illustrative of certain application of the principle of the present invention. Numerous modifications may be made to the system and method for using a buffer to facilitate log catchup for online operations invention described herein without departing from the spirit and scope of the present invention.

The invention claimed is:

1. A processor-implemented information retrieval method for providing online operations in an application to replace a target object with a shadow object, wherein the application and the target object remain accessible to a plurality of users while the application is implementing the online operations, the method comprising:
   in response to the online operations, dynamically allocating a buffer that is associated exclusively to the shadow object;
   exclusively logging to the dynamically allocated buffer, the online activities of the target object, wherein the buffer is stored in a non-persistent memory having a faster response time than a persistent memory; and
   applying the logged online activities from the dynamically allocated buffer to the shadow object to catchup the shadow object to the target object without using physical input/output operations (I/Os), thus enabling a faster response time compared to the use of the persistent memory.

2. The method of claim 1, further comprising, prior to exclusively logging to the dynamically allocated buffer, logging, to a log, the online activities of the target object, for storage to a persistent storage memory.

3. The method of claim 2, wherein applying the logged online activities from the dynamically allocated buffer to the shadow object comprises obtaining from the dynamically allocated buffer the activities logged to the dynamically allocated buffer, and obtaining from the log, the activities that have been logged exclusively to the log.

4. The method of claim 1, wherein the the dynamically allocated buffer includes a plurality of buffers, and wherein the log includes a plurality of logs.

5. The method of claim 4, wherein dynamically allocating the buffer includes sequentially allocating the buffers in response to the online activities.

6. The method of claim 4, further comprising reusing a used buffer from which online operations have been applied for the logging.

7. The method of claim 4, further comprising reusing a used buffer when available, before allocating the dynamically allocated buffer.

8. The method of claim 1, wherein the steps of exclusively logging to the dynamically allocated buffer and applying the logged online activities are performed concurrently.

9. The method of claim 1, further comprising selectively suspending the step of applying the logged online activities and resuming the step of applying the logged online activities to facilitate the online operations.

10. The method of claim 1, further comprising selectively suspending the online activities to the target object.

11. The method of claim 10, further comprising monitoring the step of applying the logged online activities relative to the step of exclusively logging to the dynamically allocated buffer, and performing the step of suspending the online activities in response to the step of monitoring.

12. The method of claim 2, wherein logging to the dynamically allocated buffer comprises flagging a successful logging to the log; and
   wherein applying the logged online activities comprises applying the online activities from the dynamically allocated buffer in response to the step of flagging.

13. A processor-implemented information retrieval system for providing online operations in an application to replace a target object with a shadow object, wherein the application and the target object remain accessible to a plurality of users while the application is implementing the online operations, the system comprising:
   a writer for dynamically allocating a buffer that is associated exclusively to the shadow object, in response to the online operations;
   a buffer logging mechanism for exclusively logging to the dynamically allocated buffer the online activities of the target object;
   wherein the buffer is stored in a non-persistent memory having a faster response time than a persistent memory; and
   an online operations provider for applying the logged online activities from the dynamically allocated buffer to the shadow object to catchup the shadow object to the target object without using physical input/output operations (I/Os), thus enabling a faster response time compared to the use of the persistent memory.

14. The system of claim 13, further comprising a persistent logging mechanism for logging to a log the online activities of the target object, the log for storage to a persistent storage memory, prior to exclusively logging to the dynamically allocated buffer.

15. The system of claim 14, wherein the online operations provider obtains from the dynamically allocated buffer the activities logged to the dynamically allocated buffer, and further obtains, from the log, activities that have been logged exclusively to the log.

16. The system of claim 13, wherein the dynamically allocated buffer includes a plurality of buffers, and wherein the log includes a plurality of logs.

17. The system of claim 16, wherein the buffer logging mechanism sequentially allocates the buffers in response to the online activities.

18. The system of claim 16, wherein the buffer logging mechanism reuses a used buffer from which online operations have been applied.

19. The system of claim 16, wherein the buffer logging mechanism reuses a used buffer when available before allocating the dynamically allocated buffer.

20. The system of claim 13, wherein the online operations provider applies the online activities from the dynamically allocated buffer concurrently, as the dynamically allocated buffer logging mechanism performs the logging.

21. The system of claim 13, wherein the online operations provider selectively suspends the logged online operations, and then resumes the logged online operations, to facilitate the online operations.

22. The system of claim 13, wherein the online operations provider suspends the online activities to the target object.

23. The system of claim 22, wherein the online operations provider monitors the applied logged online activities, and suspends the online activities in response to monitoring operations.

24. The system of claim 14, wherein the buffer logging mechanism flags a successful logging to the log; and wherein the online operations provider applies the online activities from the dynamically allocated buffer in response to a flagging operation.

25. A processor-implemented information retrieval system providing online operations that includes a computer program product having executable instruction codes stored on a computer usable medium, for providing online operations in an application to replace a target object with a shadow object, wherein the application and the target object remain accessible to a plurality of users while the application is implementing the online operations, the computer program product comprising:

a set of instruction codes for dynamically allocating a buffer that is associated exclusively to the shadow object, in response to the online operations;

a set of instruction codes for exclusively logging to the dynamically allocated buffer, the online activities of the target object;

wherein the buffer is stored in a non-persistent memory having a faster response time than a persistent memory; and a set of instruction codes for applying the logged online activities from the dynamically allocated buffer to the shadow object to catchup the shadow object to the target object without using physical input/output operations (I/Os), thus enabling a faster response time compared to the use of the persistent memory.

26. The computer program product of claim 25, further comprising a set of instruction codes for logging, to a log, the online activities of the target object, for storage to a persistent storage memory, prior to exclusively logging to the dynamically allocated buffer.

27. The computer program product of claim 26, wherein the set of instruction codes for applying the logged online activities from the dynamically allocated buffer to the shadow object obtains, from the dynamically allocated buffer, the activities that have been logged to the dynamically allocated buffer, and further obtains from the log, the activities that have been exclusively logged to the log.

28. The computer program product of claim 25, wherein the the dynamically allocated buffer includes a plurality of buffers, and wherein the log includes a plurality of logs.

29. The computer program product of claim 28, wherein the set of instruction codes for dynamically allocating the buffer sequentially allocates the buffers in response to the online activities.

30. The computer program product of claim 28, further comprising a set of instruction codes for reusing a used buffer from which online operations have been applied.

31. The computer program product of claim 28, further comprising a set of instruction codes for reusing a used buffer when available, before allocating a buffer.

* * * * *